United States Patent
Chang et al.

(10) Patent No.: US 12,319,104 B2
(45) Date of Patent: Jun. 3, 2025

(54) SUSPENSION HAVING LEAF SPRING

(71) Applicants: Hyundai Motor Company, Seoul (KR); Kia Corporation, Seoul (KR)

(72) Inventors: Sehyun Chang, Suwon-Si (KR); Youngil Sohn, Yongin-si (KR); Jun Ho Seong, Seoul (KR); Min Jun Kim, Busan (KR); Sang Woo Hwang, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 316 days.

(21) Appl. No.: 18/073,125

(22) Filed: Dec. 1, 2022

(65) Prior Publication Data

US 2023/0391157 A1   Dec. 7, 2023

(30) Foreign Application Priority Data

Jul. 6, 2022   (KR) .................. 10-2022-0082999

(51) Int. Cl.
  *B60G 17/015*   (2006.01)
  *B60G 11/113*   (2006.01)
(52) U.S. Cl.
  CPC ........ *B60G 17/0152* (2013.01); *B60G 11/113* (2013.01); *B60G 2204/121* (2013.01); *B60G 2204/43* (2013.01)
(58) Field of Classification Search
  CPC .............. B60G 17/0152; B60G 11/113; B60G 2204/121; B60G 2204/43; B60G 11/10; B60G 17/023; B60G 2202/42; B60G 11/08; B60G 2202/114; B60G 2500/30; B60G 2204/40; B60G 11/02; B60G 17/0157; B60G 2202/11; B60G 2204/423;
  (Continued)

(56) References Cited

U.S. PATENT DOCUMENTS 3,970,293 A * 7/1976 Sweet .................. B60G 17/052
                                                         267/31
4,456,232 A * 6/1984 Shinbori .................. F16F 1/22
                                                         267/260

(Continued)

FOREIGN PATENT DOCUMENTS

JP   2012121339 A   6/2012
KR   2002 0052595 A   7/2002
(Continued)

*Primary Examiner* — Paul N Dickson
*Assistant Examiner* — Shams Dhanani
(74) *Attorney, Agent, or Firm* — Morgan, Lewis & Bockius LLP

(57) ABSTRACT

A leaf spring suspension includes a knuckle having a wheel to be coupled thereto, a fixed frame positioned on a vehicle body and coupled to the knuckle through a trailing arm, a leaf spring having a first end portion coupled to the knuckle and having a second end portion having a variable support point, and a support unit configured to vary the support point on the second end portion of the leaf spring, wherein the support unit includes a spring support positioned to be brought into contact with the leaf spring, and a spring driver coupled to the spring support and configured to apply driving force to change the position of the spring support, and wherein the spring driver moves the position of the spring support to change the support point on the leaf spring.

13 Claims, 8 Drawing Sheets

(58) Field of Classification Search
CPC .......... B60G 2500/22; B60Y 2400/405; B60Y 2400/42; B60Y 2400/86
See application file for complete search history.

(56) References Cited

U.S. PATENT DOCUMENTS

| | | | | |
|---|---|---|---|---|
| 5,024,463 | A * | 6/1991 | Oliver | B60G 17/023 |
| | | | | 267/260 |
| 5,129,671 | A * | 7/1992 | Walton | B60G 17/0275 |
| | | | | 267/261 |
| 5,380,028 | A * | 1/1995 | Ferris | B62D 17/00 |
| | | | | 280/405.1 |
| 5,662,357 | A * | 9/1997 | Ryu | B60G 17/0155 |
| | | | | 280/6.159 |
| 9,868,330 | B2 * | 1/2018 | Hahn | B60G 11/04 |
| 2015/0197130 | A1 * | 7/2015 | Smith | B60G 17/0155 |
| | | | | 280/124.175 |

FOREIGN PATENT DOCUMENTS

| | | | |
|---|---|---|---|
| KR | 2008 0020792 | A | 3/2008 |
| KR | 2013 0005910 | A | 1/2013 |
| KR | 101339218 | B1 | 1/2014 |
| KR | 2016 0069842 | A | 6/2016 |
| KR | 2018 0016749 | A | 2/2018 |

* cited by examiner

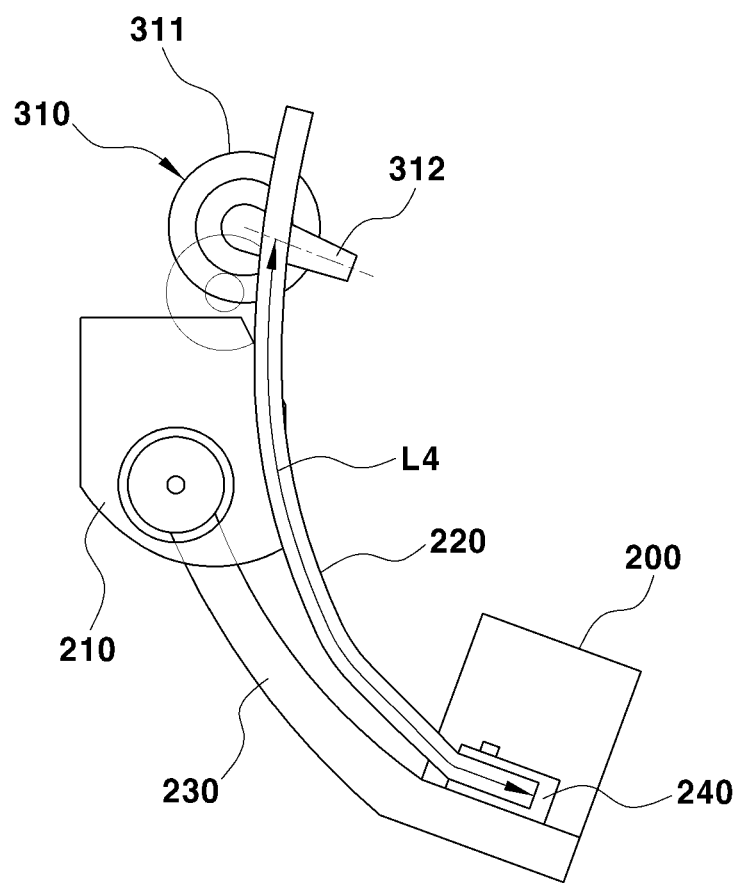

SUSPENSION HAVING LEAF SPRING

CROSS-REFERENCE TO RELATED APPLICATION

The present application claims priority to Korean Patent Application No. 10-2022-0082999, filed on Jul. 6, 2022, the entire contents of which is incorporated herein for all purposes by this reference.

BACKGROUND OF THE PRESENT DISCLOSURE

Field of the Present Disclosure

The present disclosure relates to a leaf spring suspension, and to a leaf spring suspension configured to vary the length of the leaf spring using a spring driver to control the elasticity and spring rigidity provided to the suspension.

Description of Related Art

In order to support the load on a vehicle and absorb shock transmitted from a road surface and vibration from wheels, a lateral leaf spring is installed on a suspension in the vehicle in the widthwise direction of the vehicle.

FIG. 1 illustrates an example of a suspension according to the related art. In the drawing, a subframe 101 is connected to a wheel W through a connection link 102, and a suspension 100 is connected to a vehicle body through a shock absorber 103.

The subframe 101 has a lateral leaf spring 110, installed in parallel therewith and configured to support the load of the vehicle and absorb shock and vibration. The lateral leaf spring 110 has an upper surface provided with an upper mounting bush 111 and has a lower surface provided with a lower mounting bush 112 to be mounted on the subframe 101.

However, because it is not possible to adjust the positions of the upper mounting bush 111 and the lower mounting bush 112 in the related art lateral leaf spring 110, the suspension 100 constantly exhibits the same characteristic. In other words, even though a driver wants the suspension 100 to exhibit different characteristics depending on his or her taste, the characteristics of the suspension 100 cannot be controlled.

The ride comfort and handling characteristics of the vehicle may be changed depending on the spring constant of the lateral leaf spring 110. However, because the spring constant of the lateral leaf spring 110 is fixed, it is not possible to adjust the characteristics of the suspension 100 to the initial state and the characteristics of the suspension may not be changed depending on the driver's taste even though the characteristics of the initial suspension 100 are changed due to the durability of the vehicle.

For this reason, there is a demand for a vehicle capable of varying the rigidity of the leaf spring in a case in which the height of the wheel is changed, and capable of controlling the height of the vehicle in response to the varied rigidity or changing the elasticity of the leaf spring in a case of bump or rebound of the wheel.

The information included in this Background of the present disclosure section is only for enhancement of understanding of the general background of the present disclosure and may not be taken as an acknowledgement or any form of suggestion that this information forms the related art already known to a person skilled in the art.

BRIEF SUMMARY

Various aspects of the present disclosure are directed to providing a leaf spring suspension configured for adjusting spring constant and spring rigidity of the leaf spring provided in a vehicle by varying the length of the leaf spring.

Various aspects of the present disclosure are directed to providing a leaf spring suspension configured to move the position of one end portion of the leaf spring using a spring support, which is spaced apart from the center of a motor portion and rotates about the same in order to adjust the rigidity of the leaf spring.

The objects of the present invention are not limited to the above-mentioned objects, and other objects of the present invention not mentioned herein may be understood based on the following description, and may be understood more clearly through the embodiments of the present invention. In addition, the objects of the present invention may be realized by means and combinations thereof indicated in the claims.

Various aspects of the present disclosure are directed to providing a leaf spring suspension including a knuckle having a wheel to be coupled thereto, a fixed frame positioned on a vehicle body and coupled to the knuckle through a trailing arm, a leaf spring having a first end portion coupled to the knuckle and having a second end portion having a variable support point, and a support unit configured to vary the variable support point on the second end portion of the leaf spring, wherein the support unit may include a spring support positioned to be brought into contact with the leaf spring, and a spring driver coupled to the spring support and configured to apply driving force to change the position of the spring support, and wherein the spring driver may move the position of the spring support to change the variable support point on the leaf spring.

In an exemplary embodiment of the present disclosure, the spring driver may include a motor portion configured to apply rotation force to the spring support, and a clutch portion positioned between the output stage of the motor portion and the spring support.

In another exemplary embodiment of the present disclosure, the spring driver may further include a reducer located at the output stage of the clutch portion.

In yet another exemplary embodiment of the present disclosure, the spring support may include a support cam coupled to the output stage of the spring driver and configured to rotate in response to the rotation force of the motor portion, and a spring guide coupled to the support cam and surrounding at least a portion of the leaf spring.

In yet another exemplary embodiment of the present disclosure, the output stage of the spring driver may be eccentrically coupled to the central axis of the support cam, and the central axis of the support cam may be rotated about the rotation axis of the motor portion in response to the rotation force of the motor portion.

In still yet another exemplary embodiment of the present disclosure, the leaf spring suspension may further include a load sensor configured to measure the load of the vehicle.

In a further exemplary embodiment of the present disclosure, when the load measured by the load sensor is greater than a predetermined range, a controller may move the spring support in a direction in which a length from one end portion of the leaf spring, at which the leaf spring is coupled to the knuckle, to a support point, at which the leaf spring is brought into contact with the spring support, is reduced.

In another further exemplary embodiment of the present disclosure, when the load measured by the load sensor is smaller than a predetermined range, a controller may move the spring support in a direction in which the length from one end portion of the leaf spring, at which the leaf spring is coupled to the knuckle, to the variable support point, at which the leaf spring is brought into contact with the spring support, is increased.

In yet another further exemplary embodiment of the present disclosure, when a wheel stroke is determined to be in a bump state, a controller may move the spring support so that the variable support point, at which the leaf spring is brought into contact with the spring support, moves close to the knuckle.

In yet another further exemplary embodiment of the present disclosure, when a wheel stroke is determined to be in a rebound state, a controller may move the spring support so that the variable support point, at which the leaf spring is brought into contact with the spring support, moves away from the knuckle.

In still yet another further exemplary embodiment of the present disclosure, the trailing arm may be rotatably connected to the fixed frame.

In a still further exemplary embodiment of the present disclosure, the knuckle and the trailing arm may be integrated with each other.

Other aspects and exemplary embodiments of the present disclosure are discussed infra.

It is to be understood that the term "vehicle" or "vehicular" or other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The above and other features of the present disclosure are discussed infra.

The methods and apparatuses of the present invention have other features and advantages which will be apparent from or are set forth in more detail in the accompanying drawings, which are incorporated herein, and the following Detailed Description, which together are configured to explain certain principles of the present invention.

BRIEF DESCRIPTION OF THE DRAWINGS

FIG. 7A illustrates the operation of a leaf spring suspension in a rebound state of a wheel stroke, as an exemplary embodiment of the present disclosure;

Figure 1:
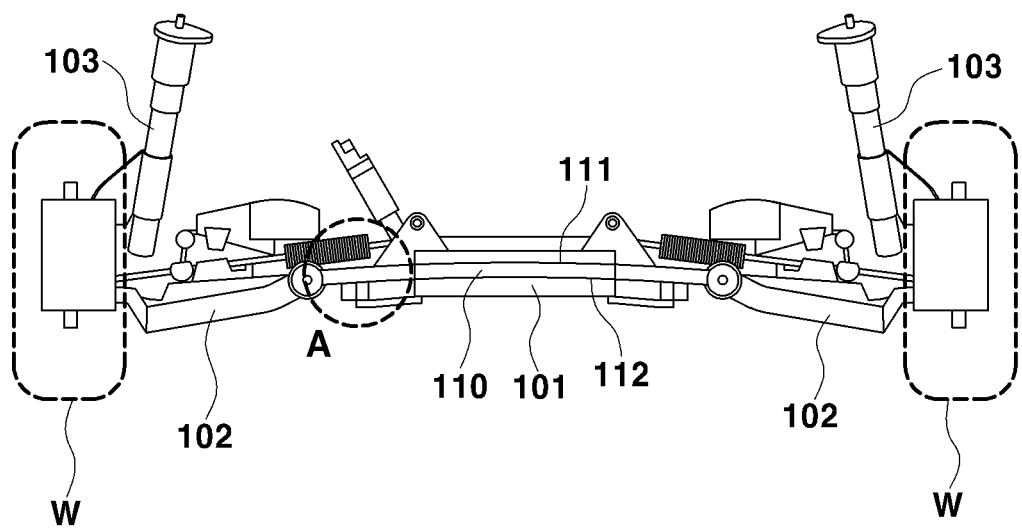
FIG. 1 illustrates the related art suspension system including a leaf spring.

It should be understood that the appended drawings are not necessarily to scale, presenting a somewhat simplified representation of various preferred features illustrative of the basic principles of the present disclosure. The specific design features of the present invention as disclosed herein, including, for example, specific dimensions, orientations, locations, and shapes, will be determined in part by the particular intended application and usage environment.

In the figures, the reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present disclosure(s) will be described in conjunction with exemplary embodiments, it will be understood that the present description is not intended to limit the present disclosure(s) to those exemplary embodiments. On the contrary, the present disclosure(s) is/are intended to cover not only the exemplary embodiments, but also various alternatives, modifications, equivalents and other embodiments, which may be included within the spirit and scope of the present disclosure as defined by the appended claims.

Hereinafter, embodiments of the present invention will be described in detail with reference to the accompanying drawings. The embodiments of the present invention may be modified into various forms, and the scope of the present invention should not be construed as being limited to the following embodiments. The embodiments are provided to more completely explain an exemplary embodiment of the present disclosure to those skilled in the art.

In addition, terms such as " . . . portion", " . . . unit", " . . . module", etc. used in the present specification each refers to a unit that processes at least one function or operation, and may be implemented as hardware, software or a combination thereof.

The terminology used herein is for describing various exemplary embodiments only, and is not intended to be limiting. A singular representation may include a plural representation unless it represents a definitely different meaning from the context.

In addition, in the present specification, "length of leaf spring 220" refers to the length between one end portion of the leaf spring 220 in contact with the vehicle body and other end portion of the leaf spring 220 in contact with the components constituting the suspension, and it means that the length between the two support points on the leaf spring 220 may vary as the support point on the other end, except for the fixed one end, is varied.

In addition, in the present specification, "rigidity" of the leaf spring may be used in substantially the same sense as "elasticity", and the elasticity may be interpreted as a change in the modulus of elasticity.

In addition, in the present specification, a clutch portion 500 may include an input shaft 503 integrated with the central axis of a motor portion 321, and an external shaft 506, which is an output stage coaxial with the central axis of the motor portion 321, coupled to a spring support 310.

Hereinafter, an exemplary embodiment will be described in detail with reference to the accompanying drawings, and in the description given with reference to the accompanying drawings, the same or corresponding components are given the same reference numerals, and a description thereof will not be repeated.

Figure 2:
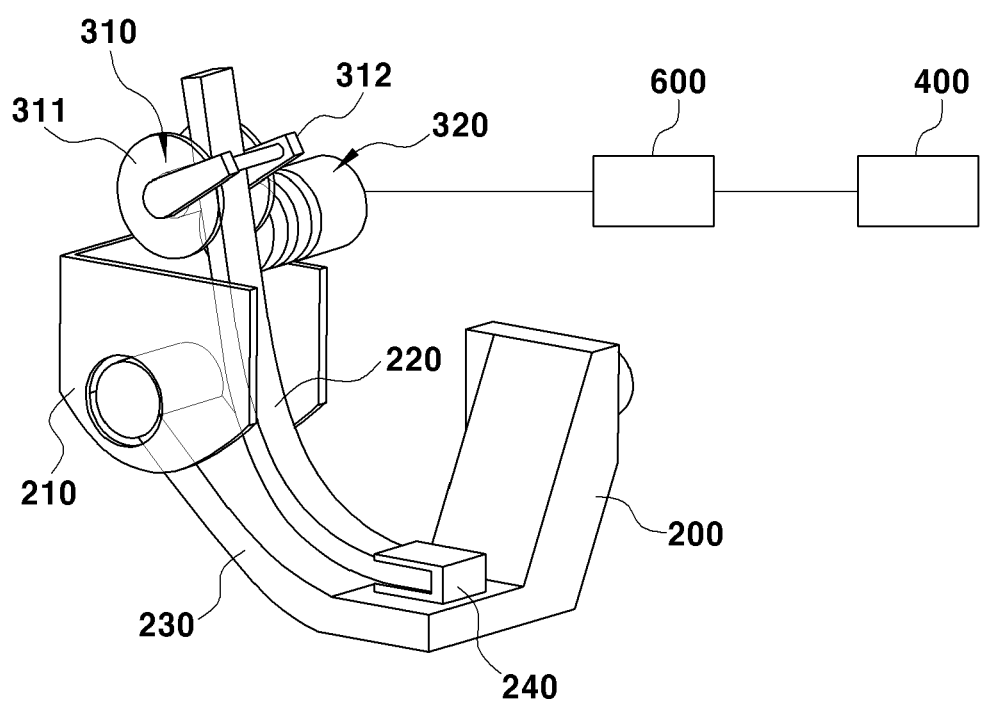
FIG. 2 illustrates a perspective view of a leaf spring suspension, as an exemplary embodiment of the present disclosure.

FIG. 2 illustrates a perspective view of the leaf spring suspension, as an exemplary embodiment of the present invention.

In an exemplary embodiment of the present invention, the suspension includes a knuckle 200 to which a wheel is coupled, a fixed frame 210 fixed to a vehicle body, and a trailing arm 230 located between the fixed frame 210 and the knuckle 200. The suspension includes a fastening portion 240 located on the knuckle 200 or on the trailing arm 230, wherein the fastening portion 240 has the one end portion of the leaf spring 220 positioned thereon. The leaf spring has the other end portion having the support point which is in contact with a support unit coupled to the vehicle body. In addition, the other end portion of the leaf spring 220 extends outwardly of the support point. The knuckle 200 and the trailing arm 230 may be integrated with each other. In addition, in an exemplary embodiment of the present disclosure, the leaf spring 220 may be made of carbon fiber reinforced plastic (CFRP).

Because the fixed frame 210 has one end portion fixed to the vehicle body and has other end portion coupled to the trailing arm 230, the trailing arm 230 may be rotatable in a height direction with respect to the fixed frame 210. Accordingly, the trailing arm 230 may integrally rotate with the knuckle 200 in a vertical direction in response to a wheel stroke.

The trailing arm 230 is bent at a predetermined angle in the height direction with respect to the lengthwise direction of the vehicle body, and the leaf spring 220 has at least one portion positioned along the trailing arm 230. In addition, the one end portion of the leaf spring 220 may be integrally bolted to the knuckle 200 or to the trailing arm 230. Here, the one end portion of the leaf spring 220 may be fixed to the knuckle 200 or to the trailing arm 230 using the fastening portion 240. The leaf spring has the other end portion at which the support point is positioned on the support unit. The other end portion of the leaf spring may be brought into contact with the spring support 310 of the support unit.

The support unit includes the spring support 310 positioned to be brought into contact with the leaf spring 220, and a spring driver 320 configured to apply driving force to change the position of the spring support 310. The spring driver 320 has one end portion fixed to the vehicle body, and has other end portion having an output stage 323 coupled to the spring support 310. Moreover, because the spring support 310 is eccentrically coupled to the output stage 323 of the spring driver 320, when the rotation force of the spring driver 320 is applied to the spring support 310, the central axis of the spring support 310 is rotated about the rotation axis of the spring driver 320 to change the position thereof. As the spring support 310 rotates, the position of the support point on the other end portion of the leaf spring 220 facing the spring support 310 is changed in the lengthwise direction of the leaf spring 220. In response to the bidirectional rotation of the motor portion 321 of the spring driver 320, the position of the spring support 310 in contact with the support point on the other end portion of the leaf spring 220 may be controlled to increase or decrease the length of the leaf spring 220.

The spring driver 320 includes the motor portion 321 configured to apply rotation force to the spring support 310, the clutch portion 500 positioned on the output shaft of the motor portion 321 and configured to transmit the bidirectional rotation of the motor portion 321, and a reducer 322 positioned at the output stage 323 of the clutch portion 500 and configured to control the amount of rotation of the output stage based on the amount of rotation of the motor portion 321. The motor portion 321 sets the amount of rotation base on the setting of a controller 600, and applies rotation of the output stage 323 coupled to the spring support 310 based on the set rotation amount. In addition, the clutch portion 500 transmits the rotation force to the output stage 323 in response to the bidirectional rotation of the motor portion 321, and the spring support 310 is rotated by the transmitted rotation force to control the position of the spring support 310.

The spring support 310 is positioned to be brought into contact with the other end portion of the leaf spring 220, and has a side surface coupled to the output stage 323 of the spring driver 320. The spring support 310 may include a support cam 311 coupled to the leaf spring 220, and a spring guide 312 surrounding at least a portion of the leaf spring 220.

The spring guide 312 may include a spring guide link 313 rotatable about the central axis of the support cam 311, and a spring guide bar 314 brought into contact with one surface of the leaf spring 220. Moreover, the spring guide bar 314 may be coupled to the spring guide link 313 and have a degree of rotational freedom with respect to the spring guide link 313.

In an exemplary embodiment of the present invention, the support cam 311 has a cylindrical shape, and the leaf spring 220 is positioned to be brought into contact with the external circumferential surface of the support cam 311. In addition, the output stage 323 of the spring driver 320 is eccentrically coupled to the side surface of the support cam 311 with respect to the central axis of the support cam 311. Accordingly, when the rotation force of the motor portion 321 is applied, the support cam 311 rotates about the output stage 323 of the spring driver 320, and the position of the support point on the other end portion of the leaf spring 220 in contact with the support cam 311 is moved integrally with the support cam 311.

In addition, in an exemplary embodiment of the present invention, the suspension may further include a load sensor 400 located in the vehicle. Accordingly, when a load measured by the load sensor 400 is greater than a predetermined range (set value), the controller 600 drives the spring driver 320 and rotates the spring support 310 to move the other end portion of the leaf spring 220 to a position close to the one end portion of the leaf spring 220, increasing the rigidity of the leaf spring 220.

Conversely, when the load measured by the load sensor 400 is smaller than the predetermined range (set value), the controller 600 drives the spring driver 320 in another direction and rotates the spring support 310 in the other direction to move the other end portion of the leaf spring 220 to a position far from the one end portion of the leaf spring 220, reducing the rigidity of the leaf spring 220.

As such, the controller 600 in an exemplary embodiment of the present disclosure may control the rigidity of the leaf spring 220 to adjust the vehicle height based on the load on the vehicle.

In addition, in an exemplary embodiment of the present invention, the controller 600 may receive information as to whether the vehicle is in a bump state or in a rebound state, and may control the support unit based on the received vehicle state. For example, when a wheel stroke is determined to be in a bump state, the controller 600 controls the support unit so that the other end portion of the leaf spring 220 is moved to a position close to the one end portion of the leaf spring 220. Conversely, when the wheel stroke is determined to be in a rebound state, the controller 600 controls the support unit so that the other end portion of the leaf spring 220 is moved to a position away from the one end portion of the leaf spring 220.

Accordingly, the controller 600 may control the position of the spring support 310 to vary the rigidity of the leaf spring 220 based on the load applied to the vehicle or based on the wheel stroke state.

Figure 3:
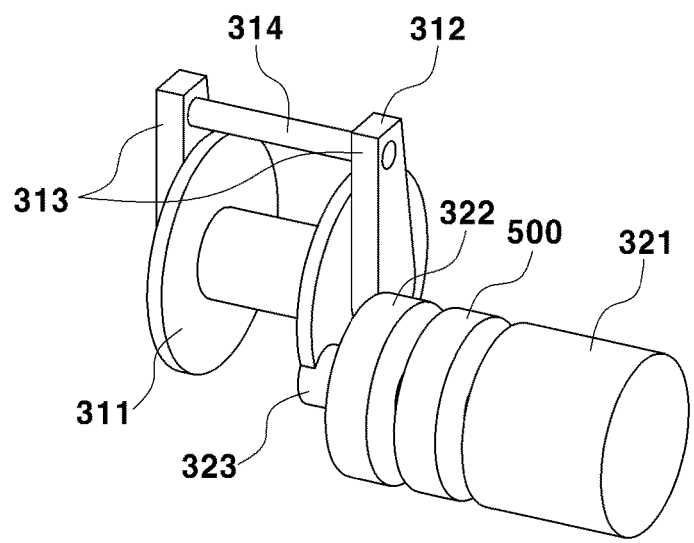
FIG. 3 illustrates the configuration of a spring driver of a leaf spring suspension, as an exemplary embodiment of the present disclosure.
Figure 4:
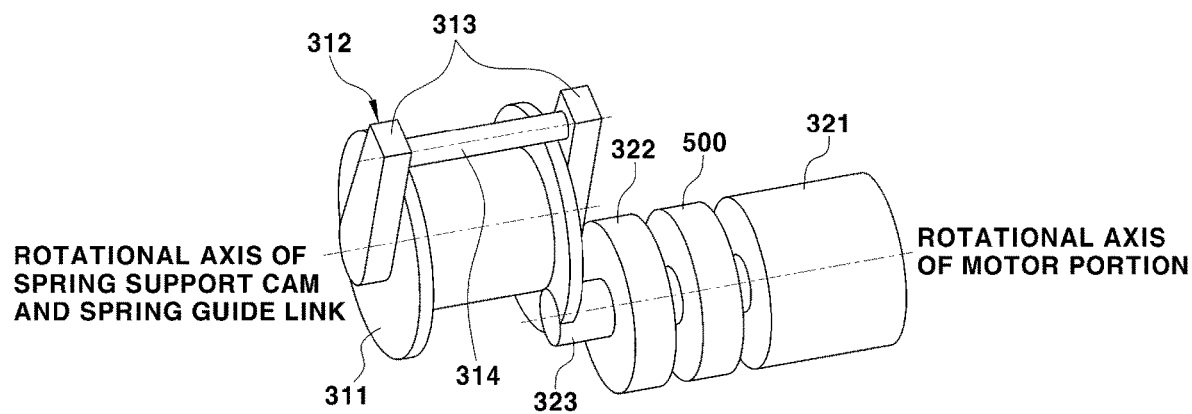
FIG. 4 illustrates the operation of a spring driver of a leaf spring suspension, as an exemplary embodiment of the present disclosure.

FIG. 3 and FIG. 4 illustrate the structure of the support unit, as an exemplary embodiment of the present invention.

As described above, the support unit includes the spring support 310 positioned to be brought into contact with the leaf spring 220, and the spring driver 320 configured to apply the rotation force to the spring support 310.

The spring driver 320 receives power through a battery located in the vehicle, and rotation force is applied to the motor portion 321 based on the power applied to the spring driver 320. The motor portion 321 to which the rotation force is applied applies the rotation force to the support cam 311 of the spring support 310 through the clutch portion 500, performing bidirectional rotation, and the reducer 322, located at the output stage of the clutch portion 500. Because the output stage 323 of the spring driver 320 is eccentrically coupled to the support cam 311 of the spring support 310, when the driving force of the motor portion 321 is applied, the spring support 310 having a predetermined distance in a radial direction from the rotation axis of the output stage 323 of the spring driver 320 is rotated integrally with the output stage 323 of the spring driver 320. Accordingly, the support point on the other end portion of the leaf spring 220 which is coupled to the spring support 310 is changed, changing the rigidity applied through the leaf spring 220.

Because the other end portion of the leaf spring 220 is positioned to be brought into contact with the support cam 311 and the spring guide 312 is coupled to the support cam 311, the upper end portion of the leaf spring 220 may be prevented from being separated from the support cam 311. The spring guide 312 includes the spring guide link 313, surrounding a portion of the leaf spring 220 in a radial direction from the central axis of the support cam 311, and the spring guide bar 314, brought into contact with one surface of the leaf spring 220 and having opposite end portions each fastened to the spring guide link 313 to be rotatable therewith.

Furthermore, the rotation force, applied from the output stage of the spring driver 320 to the support cam 311 based on the amount of rotation of the motor portion 321, rotates the central axis of the support cam 311 about the central axis of the output stage. The rigidity of the leaf spring 220 may be determined based on the distance from the output stage of the spring driver 320 to the central axis of the support cam 311.

FIG. 4 illustrates the positional relationship between the central axis of the support cam 311 coupled to the output stage 323 of the spring driver 320 and the link axis of the spring guide 312.

As illustrated in the drawing, the spring driver 320 is eccentrically coupled to the support cam 311 of the spring support 310, and as such, the output stage 323 of the spring driver 320 is fixed to the support cam 311 at a position where the output stage 323 is eccentric by a predetermined distance from the central axis of the support cam 311.

For this reason, when the rotation force of the motor portion 321 is applied, the spring support 310 is integrally moved with the spring driver 320 in the rotation direction of the output stage 323 of the spring driver 320.

In order to prevent the leaf spring 220 from being separated from the spring support 310 when the support cam 311 is rotated by the driving force of the spring driver 320, the spring guide 312 surrounds at least a portion of the leaf spring 220 and is spaced apart from the external circumferential surface of the support cam 311 to rotate integrally with the support cam 311.

The spring guide 312 is rotatably coupled to the central axis of the support cam 311 and is positioned to be in contact with one surface of the leaf spring 220 so that the leaf spring 220 is kept in contact with the support cam 311 while the support cam 311 rotates.

Figure 5A:
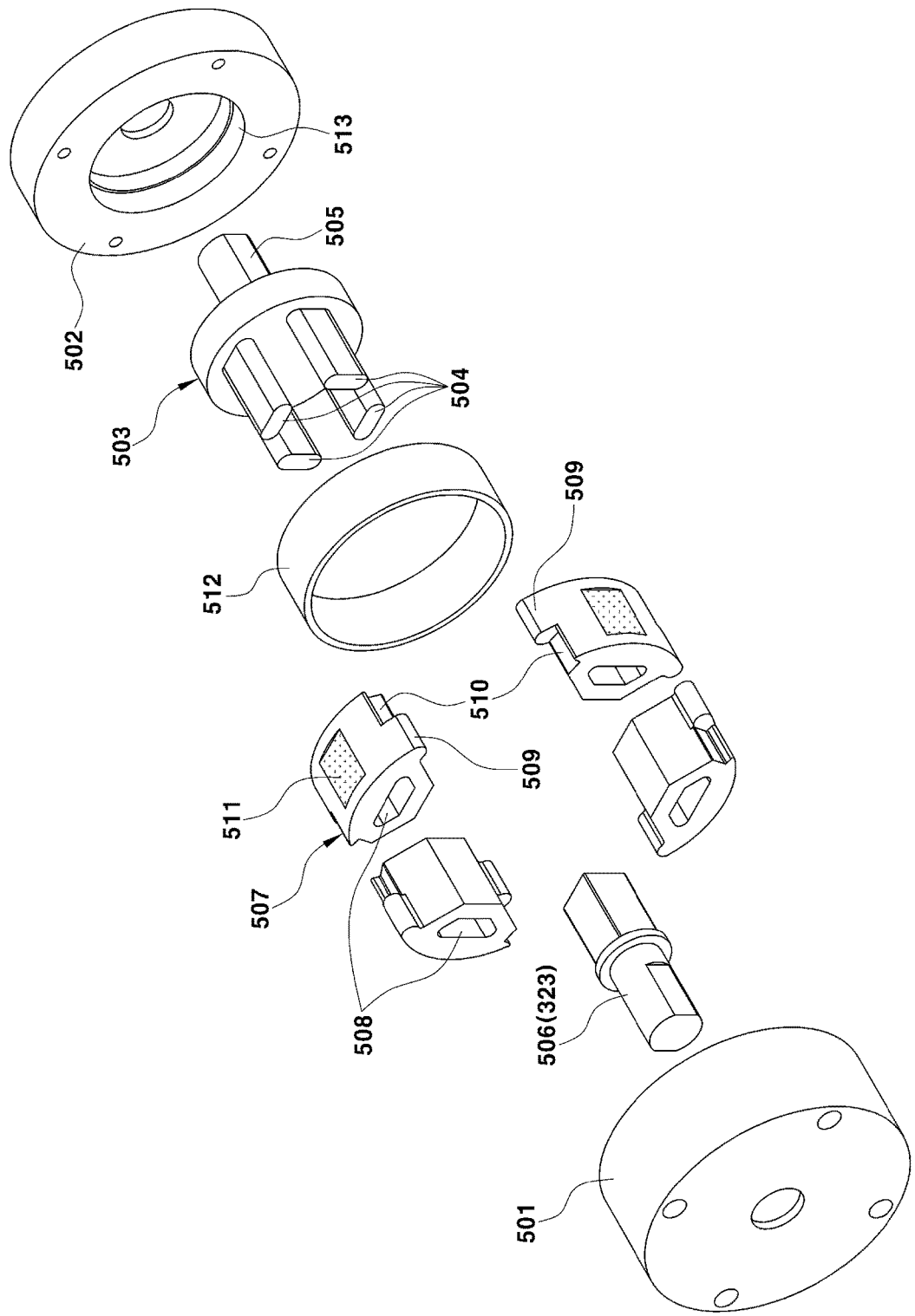
FIG. 5A is an exploded perspective view of a clutch portion of a spring driver according to various exemplary embodiments of the present disclosure.
Figure 5B:
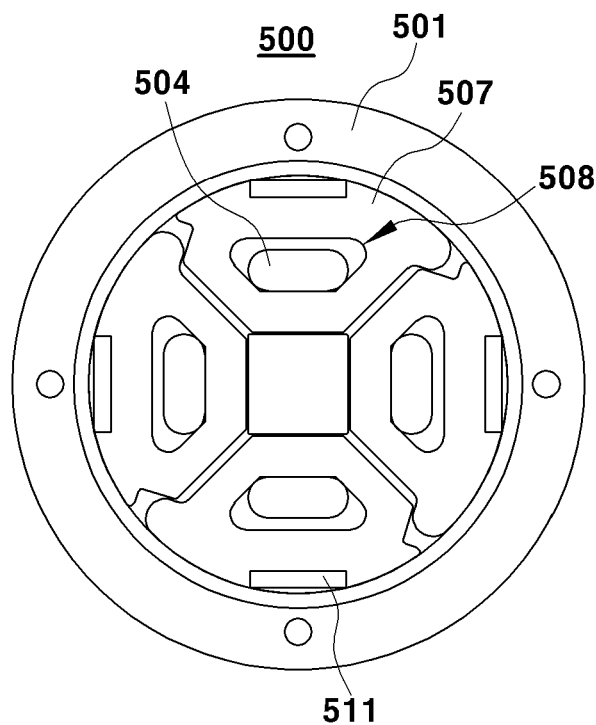
FIG. 5B is a front view of a clutch portion of a spring driver according to various exemplary embodiments of the present disclosure.

FIG. 5A and FIG. 5B illustrate the configuration of the clutch portion 500 coupled to the motor portion 321, as an exemplary embodiment of the present invention.

The clutch portion 500 includes a housing 501 and a covering portion 502, provided at open one end portion of the housing and surrounding the same. The housing 501 has a circular cross-section, and the covering portion 502 covers the entire opening at the one end portion of the housing 501.

The clutch portion 500 further includes the external shaft 506 (output stage) penetrating other end portion of the housing 501 and having at least one flat surface. The housing 501 has an internal side provided with a plurality of lockers 507 surrounding the flat surfaces on the external shaft 506 (output stage), and the input shaft 503 has one end portion inserted into openings 508 each formed in a corresponding locker 507. The number of the flat surfaces on the external shaft 506 (output stage) corresponds to the number of lockers 507 positioned inside the housing 501. The external shaft 506 (output stage) in an exemplary embodiment of the present disclosure may have four flat surfaces corresponding to four lockers 507. In addition, because each of the flat surfaces on the external shaft 506 (output stage) is brought into contact with a corresponding locker 507 adjacent thereto, when the rotation force of the input shaft 503 is applied, the locker 507 and the external shaft 506 (output stage) may be selectively surface-coupled to each other.

The input shaft 503 has the one end portion in which at least a portion thereof in the longitudinal direction is inserted into the openings 508 each formed in a corresponding locker 507, and has other end portion having a drive transmitting portion 505 penetrating the covering portion 502 and protruding outwards. The drive transmitting portion 505 is coupled to a driving portion which applies rotation force, to rotate integrally with the driving portion in the rotation direction thereof.

Moreover, the rotation force of the driving portion is applied to the drive transmitting portion 505 located at the other end portion of the input shaft 503, and the driving force applied to the drive transmitting portion 505 is transmitted to the external shaft 506 (output stage) through the rotation transmitting portion 504, rotating the external shaft 506. The driving portion may transmit the driving force to rotate the input shaft 503, and the plurality of lockers 507 may be surface-coupled to the flat surfaces on the external shaft 506 (output stage), respectively, to correspond to the rotation force of the input shaft 503. In an exemplary embodiment of the present invention, the driving portion coupled to the input shaft 503 may be the motor portion 321.

Because the input shaft 503 includes the rotation transmitting portion 504 inserted in the openings 508, the openings 508 each formed in a corresponding locker 507, the input shaft 503 includes four rotation transmitting portions 504 corresponding to the four lockers 507 in an exemplary embodiment of the present invention, and each of the rotation transmitting portions 504 may maintain the state of being inserted in a corresponding opening 508. Moreover, the rotation transmitting portion 504 is rotated in the same direction as the rotation direction of the drive transmitting portion 505, and the locker 507 brought into contact with the rotation transmitting portion 504 through the opening 508 is integrally rotated therewith in the rotation direction of the input shaft 503.

The housing 501 of the clutch portion 500 has an internal side provided with a brake unit. Because the brake unit is configured to regulate the movement of the plurality of lockers 507 when the rotation force of the external shaft 506 (output stage) is applied to the inside of the clutch, the rotation force of the external shaft 506 (output stage) is not allowed to be transmitted to the input shaft 503. The brake unit of the present invention includes a magnetic portion 511 located on the outermost side of the locker 507, a steel portion 512 positioned on the internal circumferential surface of the housing 501 and corresponding to the position of the magnetic portion 511, and a brake portion 513 located adjacent to the steel portion 512 and selectively brought into contact with the locker 507.

The plurality of lockers 507 is located inside the housing 501, and the flat surfaces on the external shaft 506 (output stage) each may be located adjacent to a corresponding locker 507. The number of the lockers 507 is at least two, and each of the lockers 507 is positioned to have a predetermined gap between the flat surface on the external shaft 506 (output stage) and the housing 501. The number of flat surfaces on the external shaft 506 (output stage) may be the same as the number of lockers 507, and the internal surface of each of the lockers 507 may be positioned adjacent to a corresponding flat surface on the external shaft 506 (output stage).

In addition, when the rotation force of the input shaft 503 is applied, the internal end portion of the locker 507 is brought into contact with the flat surface on the external shaft 506 (output stage) and is spaced apart from the internal circumferential surface of the housing 501 to have a predetermined gap therebetween to allow the input shaft 503, the locker 507, and the external shaft 506 (output stage) to integrally rotate without interference with the internal circumferential surface of the housing 501.

Because the housing 501 has the internal circumferential surface provided with the steel portion 512 and at least one locker 507 has an external circumferential surface including the magnetic portion 511, when the rotation force of the input shaft 503 is released, the magnetic portion 511 of the locker 507 may be moved to a position close to the internal circumferential surface of the housing 501. In addition, the brake portion 513 adjacent to the steel portion 512 is located close to the internal circumferential surface of the housing 501, and thus the external circumferential surface of the locker 507 moves to a position to be brought into contact with the brake portion 513 by magnetic force to limit the movement of the input shaft 503.

In addition, also in a case when the rotation force of the external shaft 506 (output stage) is applied, the flat surfaces on the external shaft 506 (output stage) push the plurality of lockers 507, respectively, in the radial direction to allow the brake portion 513 located on the internal circumferential surface of the housing 501 and the external circumferential surface of the locker 507 to fixedly come into contact with each other. Accordingly, transmission of the rotation force of the external shaft 506 (output terminal) to the input shaft 503 may be prevented. The brake portion 513 may be provided at a position relatively closer to the locker 507 than the steel portion 512, and thus the magnetic portion 511 of the locker 507 may be prevented from being in direct contact with the steel portion 512.

The locker 507 and the internal circumferential surface of the housing 501 may have a predetermined gap therebetween depending on the position of the locker 507. Accordingly, in a state in which the driving force of the input shaft 503 is released, the external circumferential surface of the locker 507 is moved to a position adjacent to the internal circumferential surface of the housing 501 by the magnetic force of the magnetic portion 511 to minimize the gap between the internal circumferential surface of the housing 501 and the external circumferential surface of the locker 507.

Conversely, when the input shaft 503 is rotated, the rotation transmitting portion 504 of the input shaft 503 is brought into contact with one end portion of the opening in the locker 507 in the widthwise direction thereof, and the rotation force may be applied so that each locker 507 is rotated in the rotation direction of the driving portion. Here, each of the lockers 507 is brought into contact with a corresponding flat surface on the external shaft 506 (output stage), and thus the gap between the internal circumferential surface of the housing 501 and the external circumferential surface of the locker 507 becomes the maximum. Accordingly, in response to the rotation of the input shaft 503, the locker 507 is positioned to surface-constrain the external shaft 506 (output stage) without creating reaction force with the housing 501.

As such, in the clutch portion 500 of the present invention, in response to the input shaft 503 rotated in a direction coincident with the direction of the rotation force applied from the driving portion, the locker 507 may be spaced apart from the internal circumferential surface of the housing 501 and may rotate integrally with the external shaft 506 (output stage). When the rotation force applied to the input shaft 503 is released, the brake portion 513 and the locker 507 come into contact with each other to limit the movement of the input shaft 503 to thereby prevent the "back drive" phenomenon.

Figure 6A:
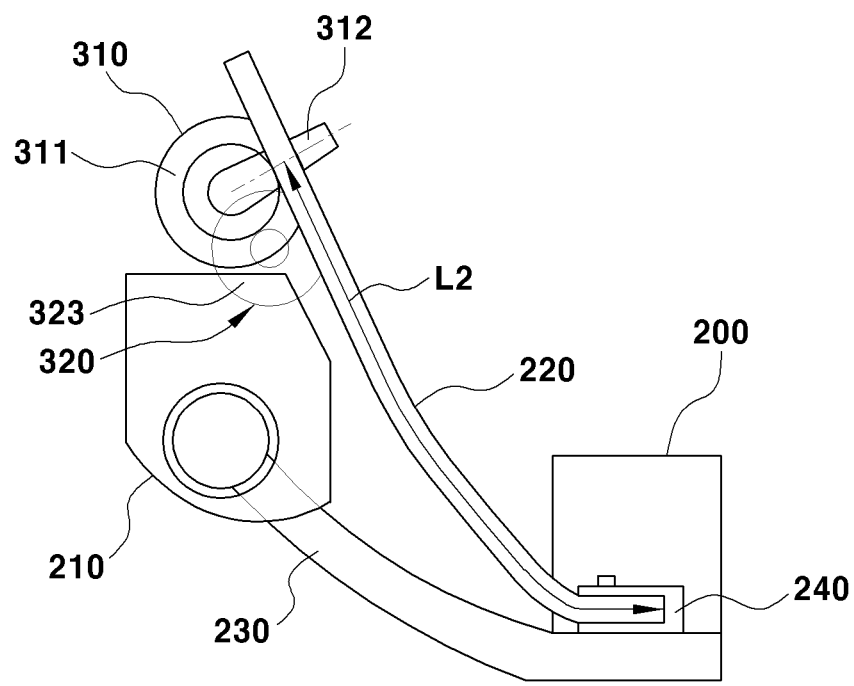
FIG. 6A illustrates the operation of a leaf spring suspension in a state in which a load smaller than a predetermined range is applied, as an exemplary embodiment of the present disclosure.
Figure 6B:
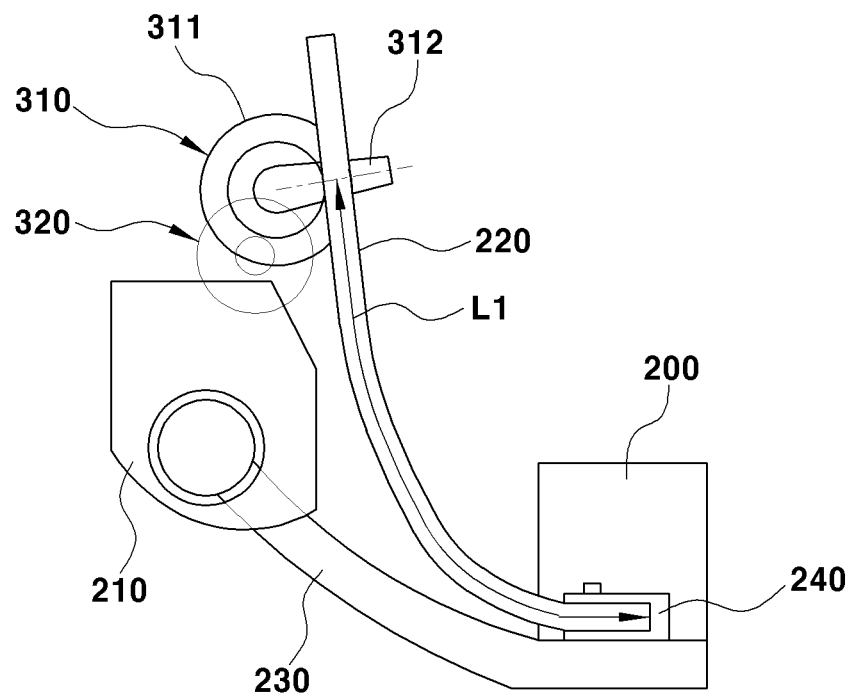
FIG. 6B illustrates the operation of a leaf spring suspension in a state in which a load within a predetermined range is applied, as an exemplary embodiment of the present disclosure.

FIG. 6A illustrates the configuration in which the position of the spring support 310 is moved in a direction to reduce the rigidity of the leaf spring 220 when the load of the vehicle measured by the load sensor 400 is smaller than a predetermined range, as an exemplary embodiment of the present invention. FIG. 6B illustrates how the leaf spring 220 is controlled when a load within the predetermined range is applied, as an exemplary embodiment of the present invention. In addition, FIG. 6C illustrates how the length of the leaf spring 220 is controlled when a measured load is greater than the predetermined range, as an exemplary embodiment of the present invention.

The controller 600 may measure the load applied from the vehicle using the load sensor 400 located in the vehicle and determine whether the measured load is within the predetermined range. Here, when the measured load is smaller than the predetermined range, the controller 600 applies power to the motor portion 321 of the spring driver 320 to rotate the spring support 310 in one direction.

As illustrated in FIG. 6A, compared with FIG. 6B, the spring support 310 is rotated counterclockwise in the drawing, and a length L2 from a point, at which one end portion of the leaf spring 220 is in contact with the knuckle 200, to a point, at which other end portion of the spring support 310 is in contact with the spring support 310, is relatively large compared to a length L1 of the leaf spring 220 illustrated in FIG. 6B. Even when the distance between the support points on the opposite end portions of the leaf spring 220 is increased, the leaf spring 220 is brought into contact with the external circumferential surface of the support cam 311, and the spring guide 312 is positioned to surround at least a portion of the leaf spring 220.

Figure 6C:
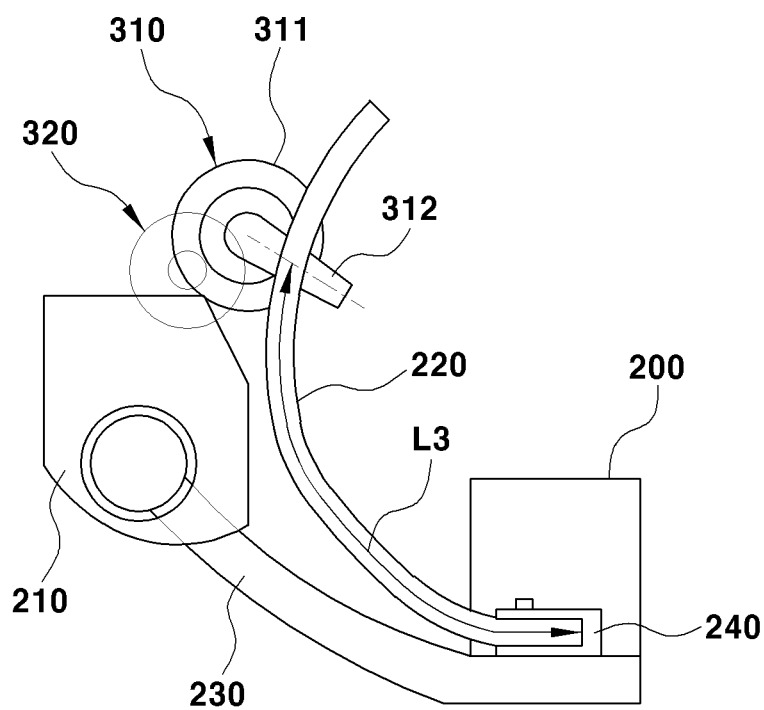
FIG. 6C illustrates the operation of a leaf spring suspension in a state in which a load greater than a predetermined range is applied, as an exemplary embodiment of the present disclosure.

In comparison with FIG. 6A, in FIG. 6C, when the measured load is greater than the predetermined range, power is applied to the motor portion 321 of the spring driver 320, and the output stage 323 of the spring driver 320 is rotated clockwise in the drawing so that the central axis of the support cam 311 is moved by the rotation angle of the output stage 323. Accordingly, the leaf spring 220 has a length L3 from the point, at which the one end portion of the leaf spring 220 is in contact with the knuckle 200, to the point, at which the other end portion of the spring support 310 is in contact with the spring support 310, becoming close to each other. With this configuration, the leaf spring 220 has a relatively high rigidity compared to the case in which a load within the predetermined range is applied.

In addition, when the opposite end portions of the leaf spring 220, each in contact with the knuckle 200 or with the spring support 310, become close to each other, the end portion of the leaf spring 220 protruding outwardly of the support cam 311 is relatively large, but the leaf spring 220 is kept in position between the spring guide 312 and the support cam 311.

Figure 7B:
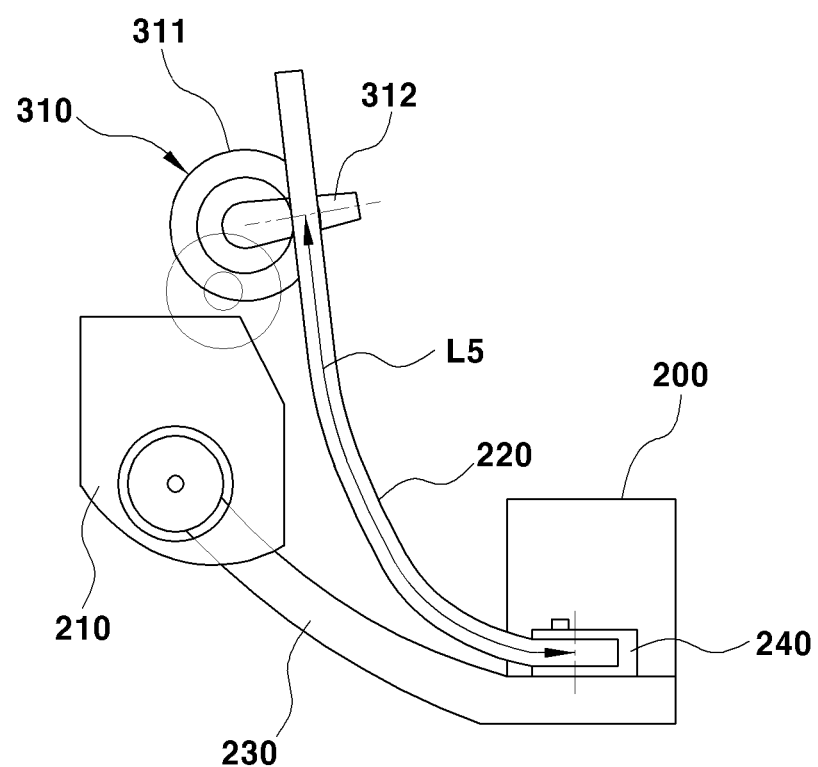
FIG. 7B illustrates the operation of a leaf spring suspension in a wheel stroke state within a predetermined range, as an exemplary embodiment of the present disclosure.
Figure 7C:
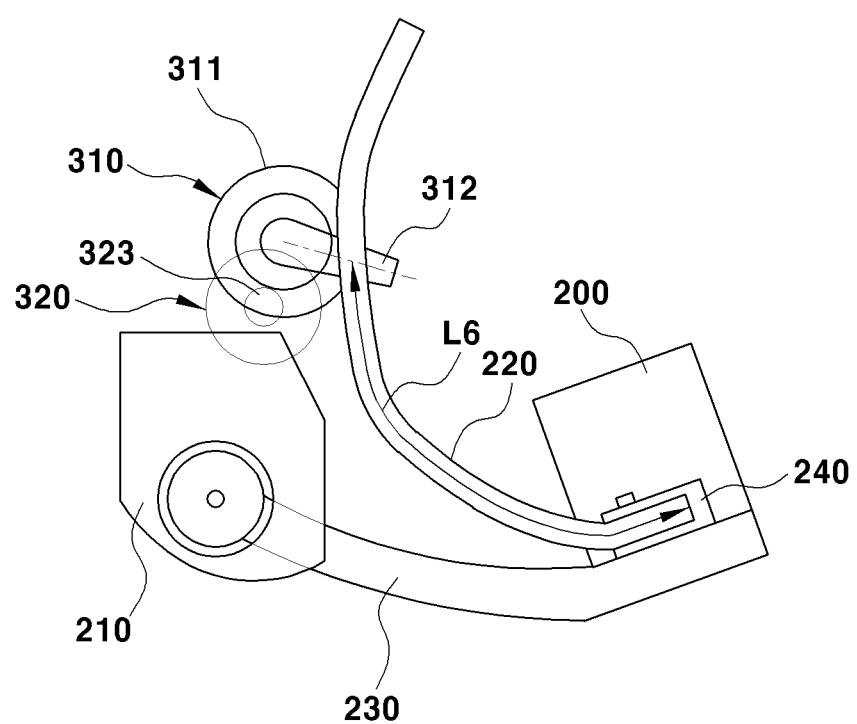
FIG. 7C illustrates the operation of a leaf spring suspension in a bump state of a wheel stroke, as an exemplary embodiment of the present invention.

FIG. 7A, FIG. 7B, and FIG. 7C each illustrates a state to control the rigidity of the leaf spring 220 in response to a wheel stroke, as another exemplary embodiment of the present invention.

In the other embodiment of the present invention, when the wheel stroke of the vehicle is changed, the vertical position of the knuckle 200 is changed with respect to the rotation axis of the trailing arm 230 positioned in the fixed frame 210, and correspondingly, the rigidity of the leaf spring 220 varies.

FIG. 7B illustrates a state in which a length L5 of the leaf spring 220 is controlled to be constant when the wheel stroke is within the predetermined range. In FIG. 7A, in comparison with FIG. 7B, when the wheel stroke is in a rebound state, the trailing arm 230 is rotationally moved downwards in the height direction of the vehicle based on the state of the wheel stroke. Accordingly, the spring driver 320 controls the spring support 310 so that the length, which is a length L4, from the fastening portion 240 to the other end portion of the leaf spring 220 being supported, becomes the largest. In other words, the spring driver 320 is rotated counterclockwise in the drawing, and accordingly, when the wheel stroke is within the predetermined range, the length from the spring support 310 to the support point on the one end portion of the leaf spring 220 is controlled to be relatively greater compared to the length L5 of the leaf spring 220.

FIG. 7C illustrates the wheel stroke in a bump state. As illustrated in the drawing, when the wheel stroke is in a bump state, the trailing arm 230 is rotated upwards in the height direction of the vehicle with respect to the fixed frame 210, and correspondingly, the spring support 310 is moved to a position where a length L6 of the leaf spring 220 becomes smaller than the length L5 of FIG. 7B. Accordingly, the controller 600 allows the motor portion 321 of the spring driver 320 to rotate in the clockwise direction and the support cam 311 is rotated in the rotation direction of the output stage 323 of the spring driver 320, thus the length between the opposite end portions of the leaf spring 220 becomes the smallest.

As such, various aspects of the present disclosure are directed to providing a technology in which the elasticity of the leaf spring 220 is controlled by changing the support point on the other end portion of the leaf spring 220 based on the vehicle height and the wheel stroke state to thereby vary the rigidity of the leaf spring 220.

As is apparent from the above description, various aspects of the present disclosure are directed to providing the following effects.

Various aspects of the present disclosure are directed to providing a leaf spring suspension configured for varying the elasticity and rigidity of the leaf spring applied to the suspension.

In addition, various aspects of the present disclosure are directed to providing a leaf spring suspension configured to control the rigidity of the leaf spring based on the vehicle height, bump, and rebound, stably operating the vehicle.

In addition, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system and store and execute program instructions which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code that may be executed by a computer using an interpreter or the like.

In an exemplary embodiment of the present invention, each operation described above may be performed by a control device, and the control device may be configured by multiple control devices, or an integrated single control device.

In an exemplary embodiment of the present invention, the control device may be implemented in a form of hardware or software, or may be implemented in a combination of hardware and software.

In addition, the terms such as "unit", "module", etc. disclosed in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A suspension having a leaf spring, the suspension comprising:
    a knuckle to which a wheel is coupled;
    a fixed frame positioned on a vehicle body and coupled to the knuckle through a trailing arm;
    the leaf spring having a first end portion coupled to the knuckle and having a second end portion having a variable support point; and
    a support unit configured to vary the variable support point on the second end portion of the leaf spring,
    wherein the support unit includes:
        a spring support positioned to be brought into contact with the leaf spring; and
        a spring driver coupled to the spring support and configured to apply driving force to change a position of the spring support,
    wherein the spring driver moves the position of the spring support to change the variable support point on the leaf spring, and
    wherein the trailing arm is rotatably connected to the fixed frame.

2. The suspension according to claim 1, wherein the spring driver includes:
    a motor portion configured to apply rotation force to the spring support; and
    a clutch portion positioned between an output stage of the motor portion and the spring support.

3. The suspension according to claim 2, wherein the spring driver further includes a reducer located at an output stage of the clutch portion.

4. The suspension according to claim 2, wherein the spring support includes:
    a support cam coupled to an output stage of the spring driver and configured to rotate in response to a rotation force of the motor portion; and
    a spring guide coupled to the support cam and surrounding at least a portion of the leaf spring.

5. The suspension according to claim 4, wherein the spring guide includes:
    a spring guide link connected to the support cam and rotatable about a central axis of the support cam; and
    a spring guide bar connected to the spring guide link and brought into contact with one surface of the leaf spring.

6. The suspension according to claim 5, wherein the spring guide bar is rotatably connected to the spring guide link.

7. The suspension according to claim 4, wherein the output stage of the spring driver is eccentrically coupled to a central axis of the support cam, and the central axis of the support cam is rotated about a rotation axis of the motor portion in response to the rotation force of the motor portion.

8. The suspension according to claim 1, further including a load sensor configured to measure a load on the vehicle.

9. The suspension according to claim 8, wherein, when the load measured by the load sensor is greater than a predetermined range, a controller is configured to rotate the spring support in a direction in which a length from the first end portion of the leaf spring, at which the leaf spring is coupled to the knuckle, to the variable support point, at which the leaf spring is brought into contact with the spring support, is reduced.

10. The suspension according to claim 8, wherein, when the load measured by the load sensor is smaller than a predetermined range, a controller is configured to rotate the spring support in a direction in which a length from the first end portion of the leaf spring, at which the leaf spring is coupled to the knuckle, to the variable support point, at which the leaf spring is brought into contact with the spring support, is increased.

11. The suspension according to claim 1, wherein, when a wheel stroke is determined to be in a bump state, a controller is configured to rotate the spring support so that the variable support point, at which the leaf spring is brought into contact with the spring support, moves close to the knuckle.

12. The suspension according to claim 1, wherein, when a wheel stroke is determined to be in a rebound state, a controller is configured to rotate the spring support so that the variable support point, at which the leaf spring is brought into contact with the spring support, moves away from the knuckle.

13. The suspension according to claim 1, wherein the knuckle and the trailing arm are integrated with each other.

* * * * *